July 17, 1934.  J. E. THORNTON  1,966,653
COLOR CINEMATOGRAPHY AND OTHER PHOTOGRAPHY AND
MEANS, METHOD, AND APPARATUS THEREFOR
Filed Feb. 16, 1932   3 Sheets-Sheet 1

INVENTOR.
J. E. Thornton
by Jowden O'Brien
atty.

July 17, 1934. J. E. THORNTON 1,966,653
COLOR CINEMATOGRAPHY AND OTHER PHOTOGRAPHY AND
MEANS, METHOD, AND APPARATUS THEREFOR
Filed Feb. 16, 1932  3 Sheets-Sheet 2

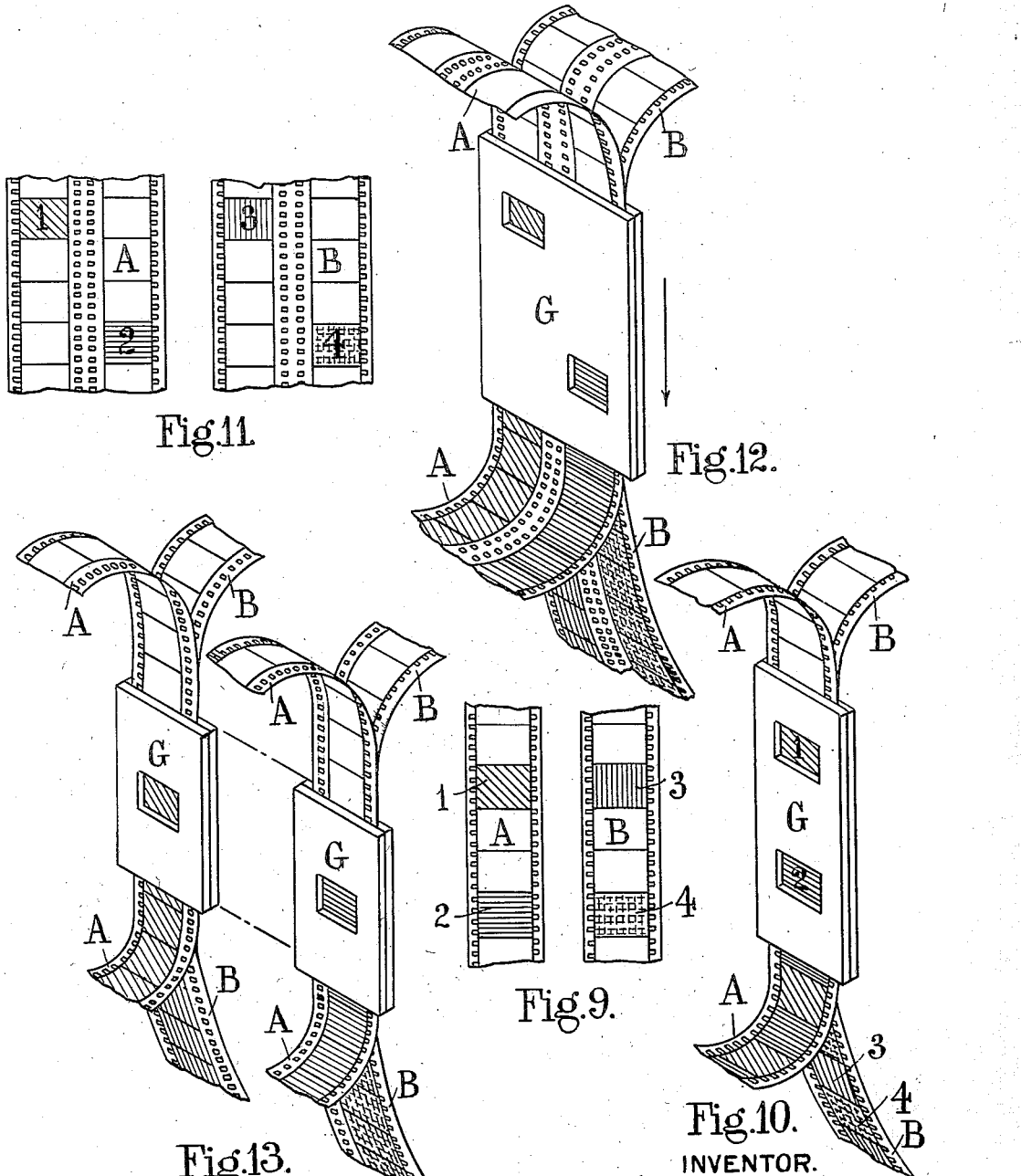

Patented July 17, 1934

1,966,653

UNITED STATES PATENT OFFICE 1,966,653

COLOR CINEMATOGRAPHY AND OTHER PHOTOGRAPHY AND MEANS, METHOD, AND APPARATUS THEREFOR

John Edward Thornton, Jersey, British Isles

Application February 16, 1932, Serial No. 593,328
In Great Britain March 3, 1931

6 Claims. (Cl. 95—2)

This invention relates to four-color photography and can be applied for producing various types of photographic images, including cinematograph pictures in the form of continuous film ribbons, and other types of pictures such as the non-cinematograph forms produced by amateurs' pocket cameras; or by the large cameras used by professionals for making portrait pictures; and also by the still larger types of cameras used in connection with the printing trade for the various reproduction processes for multicolor intaglio, planographic, or relief printing, such as photogravure, lithography, off-set printing, collotype printing, and typographical relief or half-tone block-making processes.

In a modification the same system can be used in making three-color pictures in any of the applications hereinbefore described.

The sensitive material used for forming the negative may be in the form of ribbons of perforated cinematographic film; or thin film in cartridge form for roll-film cameras or for film packs; or thick stiff cut film for small plate cameras; or glass plates for larger cameras. All these different varieties of sensitized material are hereinafter termed "films".

General description of the invention

According to the invention four images of the same subject or scene are photographed from the same viewpoint upon two films placed one behind the other, in such manner that two images are formed adjacent to each other upon the front film and another two images adjacent to each other upon the back film, immediately behind those formed on the front film by light which has passed through the front film before reaching the back film; all four images having exactly the same size and outline but differing in the portions of the scene which they each represent; one image records the red portions of the scene, another records the green portions, another records the yellow portions, and another records the blue-violet portions.

When a set of four positives is made from these four negatives and each suitably colored to correspond with the color of the scene or object they represent, and the four images are superimposed and combined, a complete positive in colors is produced in which all the colors of the scene or object are shown.

Various processes for manufacturing four-color positives are described in my numerous earlier patent specifications, and the negatives produced according to this present invention are suitable for use in carrying out the processes of manufacturing such four-color positives and also for manufacturing three-color positives from three-color negatives made according to the modifications hereinbefore referred to.

It is preferred to place the front film or films in the camera with celluloid side towards the lens, and sensitive face in close contact with the sensitive face of the back film, which is therefore turned towards the lens. By placing the two films in face-to-face contact both sensitive surfaces are brought into practically the same focal plane, so that a set of images are obtained which all have almost equal sharpness. It is preferred to use optical arrangements which will produce one pair of images reversed in relation to the other pair. But if preferred to have both images face the same way a different optical arrangement is used to produce such images. Or both pairs of films may have their sensitive surfaces or their celluloid backs turned towards the lens, thus producing four images which all face the same way. In addition to these methods of varying the image positions, they can also be varied by the form of optical device used for dividing the light according to the number of separate reflections of the light by such device.

The optical system

The optical system used for forming the images comprises two lenses of identical construction and accurately paired and a mirror or prism system for dividing the light reflected from the subject or scene into two parts and passing same through the two lenses to form two images. These two images must be absolutely identical in size, outline, and viewpoint. They are projected by the two lenses on the two pictures spaces of the front film or films to form the first pair of images, and a second pair of images are formed upon the film or films behind by the light which is not stopped by the front film but instead passes through and affects the back film. This optical apparatus, the special films, and the color filters, by which combination of devices the division of light is effected to form the four images, are all described in more detail hereinafter.

The invention will be described with reference to the accompanying drawings in which:—

Fig. 9 shows the invention applied to two single width cinematograph negative films arranged one behind the other, the front film A being sensitized for green and blue light rays and the back film B for red and yellow light rays. Two blank spaces separate the picture spaces, the film movement being two spaces at each exposure.

Fig. 10 shows the two single width negative films passing through the exposure gate.

Fig. 11 shows the invention applied to two double width cinematograph negative films the front film A being sensitized for blue and green light rays and the back film B sensitized for red and yellow light rays, the picture spaces being staggered and also separated.

Fig. 12 shows the two double width negative films passing through the exposure gate.

Fig. 13 shows an alternate form of exposure gate for use with four single width negative films in which the picture spaces are arranged side by side the front films A being sensitized for blue and green light rays and the back films B sensitized for red and yellow light rays.

According to the invention four images 1, 2, 3, 4 of the same subject or scene are photographed from the same view point upon two films A, B or other sensitized film placed one behind the other in such manner that two images 1, 2 are formed in proximity to one another on the front film A and the other two images 3, 4 are formed in proximity to one another upon the back film B immediately behind the images 1, 2 on the front film A by light which has passed through the front film A before reaching the back film. All the four images 1, 2, 3, 4 have exactly the same size and outline but differing in the portions of the scene which they represent. Thus the images 1 and 2 on the front film A may record respectively the green and the blue-violet portions of the scene and the images 3 and 4 on the back film B record respectively the red and the yellow portion of the scene.

Figure 5:
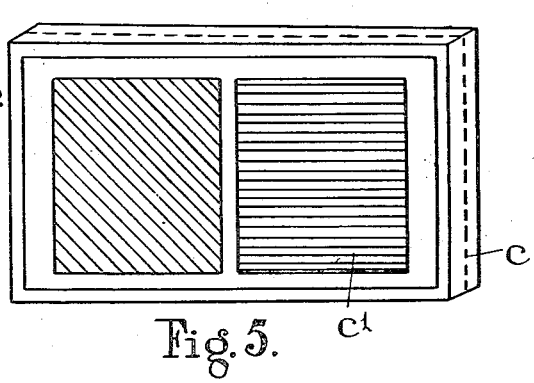
Figs. 5 and 6 show the invention applied to plates, two sensitized glass plates being bound together with a yellow filter applied to the front emulsion layer.
Figure 4:
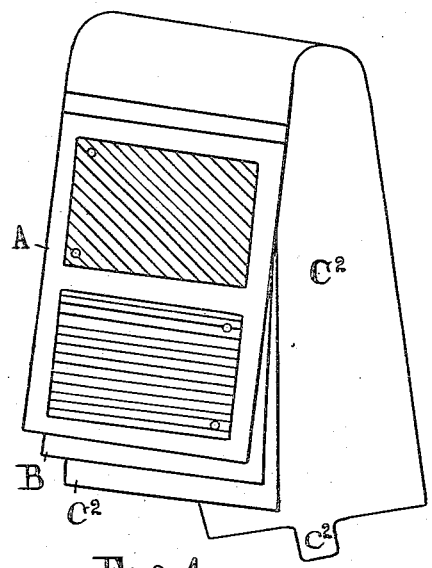
Fig. 4 shows the invention applied to a film of the type known as a daylight loading film-pack film in which the two films are mounted upon an opaque separating strip having a manipulating tab.
Figure 3:
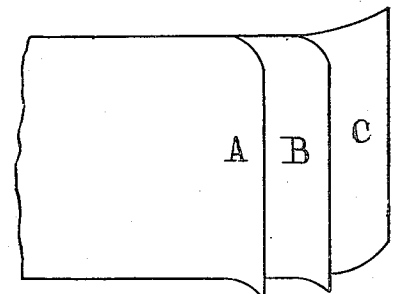
Figs. 2 and 3 show the invention applied to film of the type known as a daylight loading roll film cartridge for use in amateurs' hand cameras, the two films being mounted upon an opaque carrying band.
Figure 6:
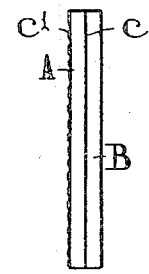
Figure 2:
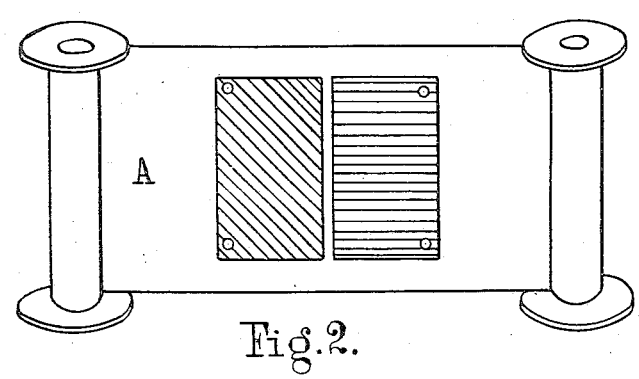
Figure 7:
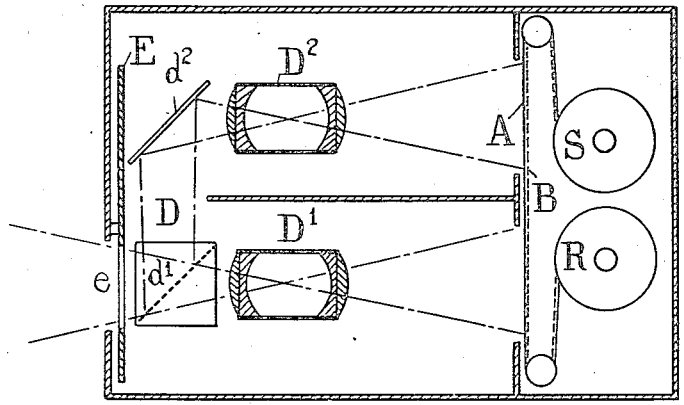
Fig. 7 shows a simple form of camera adapted for use in photo-mechanical reproduction establishments and employing a dark-room loading roll film, two films face to face without opaque carrying band.

The invention may be applied to sensitive material in many different forms Fig. 2 shows it applied to a daylight loading film cartridge for use in amateurs' cameras, the two films A and B being carried by an opaque supporting band C; Fig. 4 shows it applied to a daylight loading film pack film in which the two films A and B are mounted upon an opaque separator strip $C^2$ having a manipulating tab $c^2$; Figs. 5 and 6 show it applied to two sensitized glass plates A and B bound together at their edges $c$, a yellow filter $c^1$ being applied to the front emulsion layer, and Figs. 9 to 13 show it applied to different forms of perforated cinematograph film. All these different forms of sensitized material are hereinafter covered by the terms "film" or "films" as far as the context permits.

When a set of four positives is made from these four negatives 1, 2, 3, 4 and each suitably colored to correspond with the color of the scene or object they represent, and the four images are superimposed and combined, a complete positive in colors is produced in which all the colors of the scene are shown.

Various processes for manufacturing four-color positives are described in my numerous earlier patent specifications, and the negatives produced according to this present invention are suitable for use in carrying out the processes of manufacturing such four-color positives and also for manufacturing three-color positives from three-color negatives made according to the invention.

In the preferred arrangement the front film A is placed in the camera with its celluloid side towards the lens of the camera and sensitive face in close contact with the sensitive face of the back film B which is therefore turned towards the lens. By placing the two films in face-to-face contact both sensitive surfaces are brought into practically the same focal plane, so that a set of images are obtained which all have almost equal sharpness. But if desired both pairs of films may have their sensitive surfaces or their celluloid backs turned towards the lens.

Optical system

Figure 1:
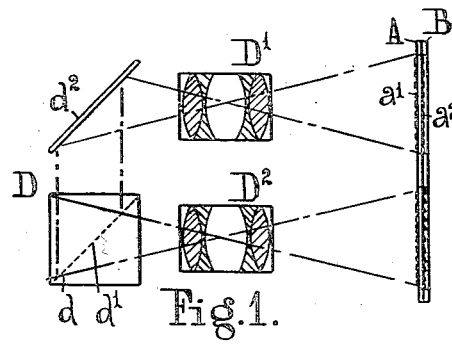
Fig. 1 is a diagrammatic view illustrating the light splitting system according to the invention.

The optical system for producing the four component images 1, 2, 3 and 4 is illustrated in Fig. 1. By this system all four images are photographed simultaneously from the same viewpoint, by placing before the two exposure-apertures of the film-gate or gates through which the films A and B pass a pair of lenses $D^1$, $D^2$ which are exactly matched in optical construction, correction, focus and other characteristics, so that they give identical images, and in front of one of the lenses of the pair is placed a light-splitting device D of known construction.

This optical device is preferably a mirror system which uses a grid-mirror $d^1$ of the partially transmitting and partially reflecting type in front of the first exposure aperture and another mirror $d^2$ of the totally reflecting type in front of the second exposure aperture in the gate.

Figure 8:
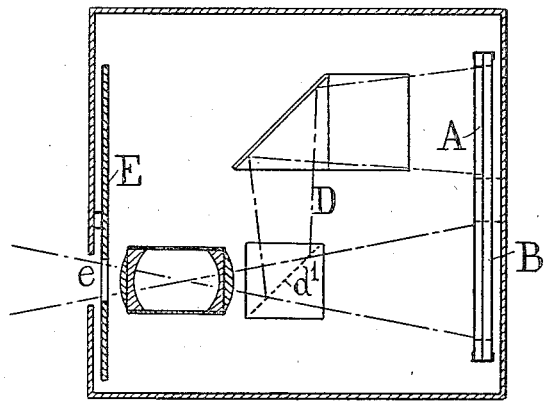
Fig. 8 shows another simple form of camera for the same purpose employing one lens instead of two and a pair of glass plates or very thick stiff films bound together as shown in Figs. 5 and 6 and having a yellow filter applied to the front emulsion layer.

Instead of front-surface-silvered open mirrors back-surface-silvered enclosed mirrors in the form of prisms may be used, in which case the longer light-beam forming the second pair of images must be reduced, by interposing in its path a shortening block or lens of glass having a suitable refractive index, to bring the longer light-beam of the first pair of images to exactly the same focal length as the short light-beam, as illustrated in Fig. 8.

Any alternative optical system which will give two images of identical size and character upon the two pairs of films may be substituted for that already described.

Film material, color filters and negatives

The film-material of the films A and B is of the usual construction, comprising a transparent support of celluloid or the like, an adhesive substratum of the usual type upon one side of the support, and a sensitive emulsion layer upon the substratum.

A feature of the invention is the character of sensitizing of the two pairs of films. Assuming that the front film A and back film B of each pair are of the double-width variety as shown in Figs. 11, 12, and 13 it is preferred that the emulsion of the back film B shall be of the highest possible speed and of panchromatic color-sensitizing, or else sensitized particularly for red and yellow light only, and that the emulsion of the front film A shall be of slow speed, low silver-content, very transparent, and color-sensitized for blue and green light.

The effect of using two films A and B of the kinds described in combination with the optical system described, by placing the films face to face with the slow transparent blue-green film A at the front and the rapid yellow red film B at the back, and exposing the yellow red film to the light which has passed through the blue green films after affecting such slow film and forming a pair of images thereon is that four images 1, 2, 3, 4 are formed at the one exposure, the front film or pair of films acting partly as light-filters to the back film or pair of films. But such partial light-filters are further supplemented by placing a pair of colored light-filters $a^1$, $a^2$ (see Fig. 1) one red and one yellow, before the front film or films; or by forming light filters on the films themselves either by staining the celluloid support (or the non-curling gelatine layer if one is used); or by staining the emulsion layer instead. In practice the latter method is a convenient one.

The colors of filters, and the operation of the filters and emulsion layers, will now be more particularly described in detail.

The front film A is sensitized with gelatine-silver emulsion of a comparatively slow and very transparent variety, sensitive only to blue and blue-green light rays.

A color filter of red dye is applied to this front film A either by dyeing the emulsion itself, or by applying a layer of colored gelatine thereto between the support and the emulsion layer, or by dyeing the celluloid support. Therefore, during exposure, this film is only affected by blue or blue-green light rays for which it is specially sensitized and the red and yellow rays pass right through to the film B behind without materially affecting the front film or forming any definite image thereon.

But the red and yellow filter, having turned the light rays into red and yellow rays, to which the front film A is not sensitive, causes the remaining light rays which pass through the front film to become red and yellow, and as the back film is of the panchromatic variety sensitive to light rays of all colors, or alternatively is sensitive specially to red and yellow, two images are formed side by side on the back film, one image corresponding to and recording the red and the other recording the yellow portions of the subject.

The first light-beam passing through the grid mirror $d^1$ and lens $D^1$ opposite to it strikes the red filter of the first front film A and produced the green-sensation negative (from which the red positive is eventually printed). The light-beam passes partially through the transparent front film and strikes the panchromatic film B behind, thus producing the red-sensation negative (from which the green positive is eventually printed).

The second light-beam, reflected from the grid mirror on to the second lens, passes through the second lens and the yellow filter on to the second front film, and produces the blue-sensation negative (from which the yellow positive is eventually printed).

The light-beam passes partially through the transparent front film and strikes the panchromatic film behind, thus producing the yellow-sensation negative (from which the blue positive is eventually printed).

Thus a group of four negatives are produced representing respectively two complementary color-pairs, one pair representing the complementary colors red and green, and the other pair representing the complementary colors blue and yellow.

The positives subsequently printed from these negatives will also be in complementary pairs, one positive pair being printed and colored green and red, and the other pair yellow and blue. When the four positive component images are superimposed and assembled in one picture-space on one film they produce, when combined, one picture built up from the colors red, green, blue and yellow. Various processes and methods for manufacturing 4-color positives are described in my numerous earlier patent specifications, and the negatives produced according to the present invention are suitable for use in carrying out the processes of manufacturing such 4-color positives.

Alternative variations of the color sensitizing of the respective films may be made. For example the two front films instead of being both alike may be differently sensitized, one specially for blue and the other specially for red; and the two back films instead of both being panchromatic may be sensitized differently, one for red and the other for yellow.

By another modification three-color photography may be substituted for four-color by two of the images being made to represent the same color and the other images two different colors, by suitable modifications of the color-filters and also of the sensitive emulsions. Thus in this way three colors are formed by four images, one of the colors being in duplicate. In this arrangement a suitable color-combination for the negative comprises red, blue and green, and for the positive, blue, yellow, and pink.

In still another modification of the same arrangement two different shades of one of the colors could be used, the combination for example being red, blue, light yellow-green and dark blue-green.

Other variations of the colors used may be made provided that the pairs are always complementary to each other. For example crimson and violet can be substituted for red and blue, provided their complementary colors are adjusted to suit, as blue-green and orange-yellow.

It has been suggested by some authorities to place the red sensitive film at the front and the green sensitive film at the back, but while such an arrangement is not excluded from application to this invention it is not an arrangement which is preferred.

The sensitive material can be of various forms according to the purpose for which it is required. The forms applicable for making cinematograph negatives have already been described.

For amateur cameras the film-material can be made up into the form of daylight loading film-cartridges, comprising the pair of films laid face to face and secured at one end to a light-proof black paper wrapper in the usual manner.

It can also be made up in the form of daylight film-packs, comprising a pair of films laid face to face and secured at their top end to a light-proof black paper separating strip, which extends over the rounded nose of a division plate of a light-proof case of the usual form and passes out through a light-trapped slit, forming a pull-tab for manipulating the film. The package contains a series of such films.

For cameras made to take flat films, a pair of films can be laid face to face mounted and detachably secured to temporary backing plate of metal or paper board.

For cameras for use by professional portrait photographers and by the printing trade, a pair of glass plates are laid face to face, and may if desired be secured at their edges by a detachable adhesive strip.

In all these forms of sensitive material the emulsion layers are of the kind already described, and it is preferred to form the necessary color filters direct on the sensitive material so that it is complete in itself; though if preferred the filters may be separate filters for use in the camera, between lens and film or glass plate, instead of being a part of the material itself.

What I claim as my invention and desire to protect by Letters Patent is:—

1. A sensitive material for multi-color photography comprising a pair of transparent supports and four separate image areas differently sensitized in pairs for each picture disposed in two superimposed side by side pairs, a pair of differently colored filters arranged in front of the front pair of image areas and a second pair of further differently colored filters in front of the rear pair of image areas.

2. A sensitive material for multi-color photography comprising a pair of transparent supports, four separate image areas for each picture disposed in two superimposed side by side pairs, a layer of slow speed transparent small silver content gelatine silver emulsion coated upon the front support, a layer of high speed panchromatic gelatine silver emulsion coated upon the rear support, a pair of different color filters arranged in front of the emulsion layer on the front support and a pair of further differently colored filters arranged in front of the emulsion layer on the rear support.

3. A sensitive material for multi-color photography comprising a pair of transparent supports, four separate image areas for each picture disposed in two superimposed side by side pairs, a layer of slow speed transparent small silver content gelatine silver emulsion coated upon the front support, a layer of high speed panchromatic gelatine silver emulsion coated upon the rear support, a pair of color filters arranged in front of the emulsion layer on the front support, one filter being pink and the other yellow and a pair of color filters arranged in front of the emulsion layer on the rear support, one filter being green and the other violet.

4. A sensitive material for multi-color photography comprising two transparent glass plates, four separate image areas for each picture disposed in two superimposed side by side pairs, a layer of slow speed transparent small silver content gelatine silver emulsion coated upon the front glass plate, a layer of high speed panchromatic gelatine silver emulsion coated upon the rear glass plate, a pair of differently colored filters arranged in front of the emulsion layer on the front glass plate and a pair of differently colored filters arranged in front of the emulsion layer on the rear glass plate.

5. A sensitive material for multi-color photography comprising two flexible films, four separate image areas for each picture disposed in two superimposed side by side pairs, a layer of slow speed transparent small silver content gelatine silver emulsion coated upon the front flexible film, a layer of high speed panchromatic gelatine silver emulsion upon the rear flexible film, a pair of differently colored filters arranged in front of the emulsion layer on the front flexible film and a pair of differently colored filters arranged in front of the emulsion layer on the rear flexible film.

6. A sensitive material for multi-color photography comprising two flexible films, an opaque separating strip to which the films are attached, four separate image areas for each picture disposed in two superimposed side by side pairs, a layer of slow speed transparent small silver content gelatine silver emulsion coated upon the front flexible film, a layer of high speed panchromatic gelatine silver emulsion upon the rear flexible film, a pair of color filters arranged in front of the emulsion layer on the front flexible film, one filter being pink and the other yellow and a pair of color filters arranged in front of the emulsion layer on the rear flexible film, one filter being green and the other violet.

JOHN EDWARD THORNTON.